United States Patent Office 3,116,335
Patented Dec. 31, 1963

3,116,335
ORGANIC SULFUR-CONTAINING COMPOUNDS
Gail H. Birum, Kirkwood, Mo., assignor to Monsanto Chemical Company, St. Louis, Mo., a corporation of Delaware
No Drawing. Filed Sept. 25, 1961, Ser. No. 140,269
2 Claims. (Cl. 260—608)

This invention relates to organic sulfur-containing compounds, to methods of preparing them, and to the uses thereof in biological toxicant compositions, e.g., in insecticide and nematocidal compositions.

It is an object of this invention to provide new biologically active organic sulfur compounds. Another object object of this invention is to provide alkyl dichloromethyl disulfides as new compounds. Another object of this invention is to provide new methods for preparing alkyl dichloromethyl disulfides. Another object of this invention is to provide insecticidal and nematocidal compositions containing at least one alkyl dichloromethyl disulfide as an essential active ingredient. It is a further object of this invention to provide methods for controlling insects and nematodes by the application of a toxicant composition containing at least one alkyl dichloromethyl disulfide compound. Other objects, aspects and advantages of the invention are apparent from a consideration of the accompanying disclosure and the appended claims.

According to this invention, alkyl dichloromethyl disulfides are prepared by reacting thiophosgene with an alkyl mercaptan substantially according to the scheme, $$RSH + CSCl_2 \rightarrow RSSCHCl_2$$

wherein R is an alkyl radical having from 1 to 12 carbon atoms.

Further, according to another aspect of this invention, alkyl dichloromethyl disulfides are prepared by reacting dichloromethylsulfenyl chloride with an alkyl mercaptan substantially according to the scheme, $$RSH + CHCl_2SCl \rightarrow RSSCHl_2 + HCl$$

wherein R is defined above.

Thus, the present invention provides compounds of the formula $$RSSCHCl_2$$

wherein R is as defined above.

Further, according to the present invention, there are provided biological toxicant compositions, e.g., insecticidal and nematocidal compositions, containing a carrier adjuvant and as an essential active ingredient, a lethal amount of at least one alkyl dichloromethyl disulfide compound having the above generic formula.

Further, according to the present invention, there are provided methods for controlling biological pests, e.g., insects, nematodes, etc., by the application of said above defined biological toxicant compositions.

The process of this invention which utilizes thiophosgene and an alkyl mercaptan to obtain an alkyl dichloromethyl disulfide involves a simple addition reaction wherein the hydrogen atom bonded to the sulfur atom of the alkyl mercaptain reactant becomes bonded to the carbon atom of the thiophosgene reactant, and the alkyl mercaptan residue becomes bonded to the sulfur atom of the thiophosgene. This addition reaction is surprising since the expected reaction would be replacement of one of the halogen atoms of the thiophosgene to give a product of the formula RSC(S)Cl wherein R is as defined above. This new and preferred process for preparing alkyl dichloromethyl disulfides thus provides for the economical use of readily available reactants while eliminating the necessity of removing by-product materials. By using essentially stoichiometric proportions of the reactants the removal of excess reactants can likewise be eliminated.

The alkyl dichloromethyl disulfide compounds can also be prepared by reacting dichloromethylsulfenyl chloride with alkyl mercaptans. According to this process, the chlorine atom bonded to the sulfur atom of the dichloromethylsulfenyl chloride is replaced by the RS— group of the alkyl mercaptan reactant which gives up a hydrogen atom in the reaction. Hydrogen chloride is obtained as a by-product.

The alkyl mercaptan compounds useful for preparing alkyl dichloromethyl disulfides according to either of the above described processes include: methyl, ethyl, propyl, isopropyl, n-butyl, tert-butyl, isobutyl, tert-pentyl, n-pentyl, n-hexyl, 2-ethylhexyl, as well as normal and branched chain octyl, nonyl, decyl, undecyl and dodecyl mercaptans and mixtures of said mercaptans.

The thiophosgene and dichloromethylsulfenyl chloride used in the reaction with alkyl mercaptans to produce the alkyl dichloromethyl disulfides are well known, readily available materials.

The present alkyl dichloromethyl disulfide products are well defined, usually liquid compounds which are generally soluble in ether, acetone, and chloroform but which are insoluble in water. As will be shown hereinafter, the present alkyl dichloromethyl disulfides are characterized by high biological toxicant activity, particularly against insect and nematode organisms. This effect is demonstrated when they are present in treating compositions in very small concentrations, for example, in quantities of as low as from 0.5 to 200 parts per million.

The reactions of the alkyl mercaptans with thiophosgene or with the dichlormethylsulfenyl chloride are moderately exothermic in nature, and the preparations are normally conducted in an inert solvent medium under controlled temperature conditions. In general, reaction temperatures in the range of −20° C. to 100° C. are used, and preferably the temperature is maintained within the range of from 0° C. to 50° C. under atmospheric pressure conditions. The use of solvents is advantageous when working with the more reactive alkyl mercaptans. Such solvents may be, e.g., benzene, toluene, xylene, dioxane, hexane, cycloalkanes, and alkyl halides such as methylene chloride, methylene bromide, chloroform, carbon tetrachloride, etc. It is also preferred practice to incorporate into the reaction medium a basic material to accelerate the reaction when thiophosgene is employed. Such basic materials are, e.g., sodium hydroxide, potassium hydroxide, sodium carbonate, potassium carbonate, the tertiary organic amines such as triethylamine, tripropylamine, tributylamine, dimethylaniline, pyridine, etc.

Separation of the alkyl dichloromethyl disulfide products from the reaction medium may be accomplished by means known in the art. When the product is liquid, distillation or solvent extraction procedures are normally sufficient. Solid products may be separated by filtration, washing, recrystallization procedures, etc. Further purification by selective solvent extraction or by absorptive agents such as activated carbon or clays can precede the removal of the inert liquid or solvent. However, the product is generally satisfactory for insecticidal and nematocidal purposes without further purification.

The presently provided alkyl dichloromethyl disulfides are effective against a wide variety of insect pests and nematodes. It will be understood that the term "insect" and "insecticide" unless otherwise modified are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act"

of 1947, Section 2, subsection *h,* wherein the term "insect" is used to refer not only to those small invertebrate animals belonging mostly to the class Insecta, comprising six-legged usually winged forms, as beetles, bugs, bees, flies, and so forth, but also to other allied classes or arthropods whose members are wingless and usually have more than six legs, as spiders, mites, ticks, centipedes, and wood lice.

Although the alkyl dichloromethyl disulfides are useful per se for controlling a wide variety of insect and nematode pests, a particular embodiment of this invention provides biological toxicant compositions containing as an essential active ingredient therein an insecticidal or nematocidal amount of one or more alkyl dichloromethyl disulfide compounds in a dispersed form in a suitable extending agent. The term "dispersed" as used herein means that the particles of the alkyl dichloromethyl disulfide may be molecular in size and held in true solution in a suitable organic solvent. It means further that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with or distributed throughout a solid carrier providing a mixture in particulate form, e.g., pellets, granules, powders, or dusts. The term "dispersed" also includes mixtures which are suitable for use as aerosols including solutions, suspensions, or emulsions of the alkyl dichloromethyl disulfides in a carrier such as dichlorodifluoromethane and like fluorochloroalkanes which boil below room temperature at atmospheric pressure.

As insecticides the alkyl dichloromethyl disulfides may be applied conveniently in the form of a spray containing the alkyl dichloromethyl disulfide in a concentration within the range of 0.01% to 10% by weight. Although they are insoluble in water, they are soluble in organic solvents. They may be dispersed directly in water or a solution in an organic solvent emulsified in aqueous medium by the aid of a dispersing agent. If application in dust form is preferred, they may be diluted with a carrier such as clay, talc or bentonite.

The alkyl dichloromethyl disulfides are unusually effective as soil sterilizing agents especially for the reduction of the population of nematodes and the prevalence of fungus. This invention thus provides a method for controlling nematodes which may be practiced by any method which accomplishes dispersion of the alkyl dichloromethyl disulfides in the soil. Any of the well known procedures for effecting this result may be utilized; e.g., by injecting the compound, or formulations containing the compound into the soil, by depositing the substance or formulations on the surface of the soil and dispersing them within the soil by any conventional mechanical equipment, and by drenching the soil with a solution or liquid dispersion in water.

The choice of the means of dispersing the toxicants in the soil is within the province of one skilled in the art. If the compounds are volatile as are some of the lower molecular weight alkyl dichloromethyl disulfide homologs, the treating agents are preferably dissolved or dispersed in a suitable liquid medium which when formulated with a suitable emulsifying agent or other surface active agent will enable a uniform dispersion in water. The use of solutions or dispersions also insures a uniform application of the alkyl dichloromethyl disulfide to the soil being treated.

However the toxicants are formulated, the treatment of the soil must necessarily involve the incorporation of an amount sufficient to destroy the nematodes and fungi. Some variations will be observed with different soil types and some differences in rate of application will be dictated by the sensitivity of some plants to the compounds. An additional advantage of the alkyl dichloromethyl disulfide compounds, however, is the ability of such compounds to act as systemic nematocides that is, the compounds translocate in the plant system and control nematodes feeding thereon.

In nematocidal applications these compounds may be added to the soil in solid formulations, frequently referred to as dusts, which may contain in addition to the active ingredients, diluents, or extenders to absorb the toxicant compound and thereby prevent too rapid dissipation, and dispersing agents to prevent local high concentrations. In addition these components facilitate the distribution of the active ingredients in soil and soil waters.

Suitable solid diluents are those which render the compositions dry and permanently free flowing. Thus hygroscopic materials should be avoided. Effective solid diluents are the finely divided carriers, including the clays such as the kaolinites, the bentonites, and the attapulgites; other minerals in natural state, such as talc, pyrophyllite, quartz, diatomaceous earth, fuller's earth, chalk, rock phosphate, and sulfur; and chemically modified minerals such as acid washed bentonites, precipitated calcium phosphates, precipitated calcium carbonate and colloidal silica. These diluents may represent a substantial portion, for example, 50% to 98% by weight, of the entire formulation.

Liquid compositions for nematocidal uses may be solutions or liquid dispersions. The choice of the liquid medium will depend to a great extent upon the physical properties of the active ingredient. It is frequently desirable to add a small amount of an organic solvent which can be readily dispersed in the aqueous medium to produce a heterogeneous dispersion of the active ingredient in water.

From an economical point of view the manufacturer must supply the agriculturist with a low cost concentrate or spray base or particulate solid base in such form that by merely mixing with water or solid extender (e.g. powdered clay or talc) or other low cost material available to the agriculturist at the point of use, he will have an easily prepared insecticidal or nematocidal spray or particulate solid composition. In such a concentrate composition, the alkyl dischloromethyl disulfide generally will be present in a concentration of 5 to 90% by weight, the residue being any one or more of the well known biological toxicant adjuvants, such as the various surface active agents (e.g. detergents, a soap, or other emulsifying or wetting agents, surface active clays), solvents, diluents, carrier media adhesives, spreading agents, humectants, and the like.

There are a large number of organic liquids which can be used for the preparation of solutions, suspensions or emulsions of these compounds; for example, there can be used isopropyl ether, acetone, methyl ethyl ketone, dioxane, cyclohexanone, carbon tetrachloride, ethylene dichloride, tetrachloroethane, hexane, heptane, and similar higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° C., particularly kerosene), mineral oils having an unsulfonatable residue above about 80 percent and preferably above about 90%. In those instances wherein there may be concern about the phytotoxicity of the organic liquid extending agent, a portion of the same can be replaced by such low molecular weight aliphatic hydrocarbons as dipentene, diisobutylene, propylene trimer, and the like. In certain instances it is advantageous to employ a mixture of organic liquids as the extending agent.

When supplied to the situs of the biological pest in the form of emulsions or suspensions, the biological toxicant composition containing one or more alkyl dichloromethyl disulfides as the active ingredient may be prepared by dispersing the active component either per se or in the form of an organic solution thereof in water with the aid of a water-soluble surfactant. The term "surfactant" as employed here and in the appended claims is used as in Volume II of Schwartz, Perry and Berch's "Surface Active Agents and Detergents" 1958 Interscience Publishers, Inc., New York) in place of the expression "emulsifying agent" to connote generically the various "emulsifying agents," "dispersing agents," "wetting agents," and "spreading agents" that are adapted to be admixed with the active compounds of this invention in order to secure better wetting and spreading of the active ingredients in the water vehicle or carrier in which they are insoluble by lowering the surface tension of the water (see also Frear, "Chemistry of Insecticides, Fungicides, and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents," cited supra, and also in the November 1947 issue of Chemical Industries (pages 811–824) in an article entitled "Synthetic Detergents" by John W. McCutcheon and also in the July, August, September, and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water soluble anionic surface active agents set forth in U.S. 2,846,398 (issued August 5, 1958). In general it is preferred that a mixture of water soluble anionic and water soluble non-ionic surfactants be employed.

In all of the forms described above the dispersions can be provided ready for use in combatting biological pests in general and insects and nematodes in particular. However, they can also be provided in a concentrated form suitable for mixing with or dispersing in other extending agents. As illustrative of a particular useful concentrate is an intimate mixture of an alkyl dichloromethyl disulfide of this invention with a water soluble surfactant which lowers the surface tension of water in the weight proportions of 0.1 to 15 parts of surfactant with sufficient of the alkyl dichloromethyl disulfide to make 100 parts by weight. Such a concentrate is particularly adapted to be made into a spray for combatting various forms of insect pests by the addition of water thereto. As an example of such a concentrate is an intimate mixture of 95 parts by weight of ethyl dichloromethyl disulfide and 5 parts by weight of a water soluble non-ionic surfactant such as polyoxyethylene ether. Another example of a useful insecticidal concentrate composition is from 2 to 4 lbs. of the alkyl dichloromethyl disulfide dissolved in sufficient organic solvent such as kerosene, xylene, naphtha, etc., containing from 1 to 10% of a surface active agent blend to make a gallon of insecticide concentrate composition. The surface active agent blend may comprise, e.g., a mixture of anon-ionic surface active agent such as a polyoxyethylene either and an anionic surfactive agents such as alkyl-aryl sulfonate.

A useful nematocidal formulation of these active compounds may involve the solid or liquid concentrate of the alkly dichloromethyl disulfide to which has been added formulation aids or conditioning agents so that the concentrates may be mixed with a suitable extender or diluent in the field at the time of use. Obviously, for this purpose the dispersing agent will be present in larger concentrations so that upon dilution with water or a solid extender, compositions containing optimum proportions of dispersing agent and active component will be prepared. The solid or liquid formulations are preferably applied by mechanical equipment involving spraying or spreading the formulation on soil being treated. For this purpose readily flowable compositions are required, either liquid or solid in physical state. Thus a critical aspect of the invention is the fluent carrier by use of which optimum nematocidal effects can be obtained.

The following examples illustrate methods of preparing alkyl dichloromethyl disulfides and the activity of such compounds as insecticidal and nematocidal agents. These examples are illustrative only and are not meant to limit the scope of the invention.

*Example 1*

This example illustrates the preparation of an alkyl dichloromethyl disulfide from thiophosgene and an alkyl mercaptan.

To a reaction vessel cooled in ice and containing 57.5 g. (0.5 mole) of thiophosgene and 250 ml. of chloroform, there was first added 31.1 g. (0.5 mole) of ethyl mercaptan. A solution of 0.15 mole of NaOH in 50 ml. of water was then added at 3 to 8° C. until the color of the mixture turned from red to yellow and the heat of reaction terminated. The chloroform layer was separated, washed with water, and dried over $CaCl_2$. Distillation of the dried chloroform solution gave 72.5 g. of a liquid distillate, B.P. 37°–49° C./0.02–0.2 mm. Redistillation gave essentially pure dichloromethyl ethyl disulfide, B.P. 45° C./1.0 mm., $n_D^{25}$ 1.5520, which analyzed as follows:

|  | Found | Anal. Calcd. for $C_3H_6Cl_2S_2$ |
| --- | --- | --- |
| Percent C | 20.33 | 20.35 |
| Percent H | 3.35 | 3.41 |
| Percent Cl | 40.07 | 40.00 |
| Percent S | 36.38 | 36.20 |

*Example 2*

This example illustrates the preparation of an alkyl dichloromethyl disulfide from dichloromethylsulfenyl chloride and an alkyl mercaptan.

Ethyl mercaptan was added dropwise at 5 to 10° C. to 151.4 g. of dichloromethylsulfenyl chloride until the exothermoc reaction ceased and the reaction mixture was nearly decolorized. The product was allowed to stand overnight and then distilled to give 174 g. (98% yield) of crude dichloromethyl ethyl disulfide, B.P. 41–43° C./1 mm., $n_D^{25}$ 1.5489, which analyzed as follows:

|  | Found | Anal. Calcd. for $C_3H_6Cl_2S_2$ |
| --- | --- | --- |
| Percent C | 20.66 | 20.35 |
| Percent H | 3.70 | 3.41 |
| Percent Cl | 40.01 | 40.00 |

*Example 3*

An alkyl dichloromethyl disulfide was tested for nematocidal activity against the organism *Panagrellus redivivus* as follows:

The *Panagrellus redivivus* was cultured in an oatmeal medium prepared by placing 5 grams of dry rolled oats in a 9 cm. Petri dish and covering with 10–20 mls. of tap water. The cultures are inoculated by adding 10 mls. of a washed suspension of worms. Variability in vigor and resistance to chemical treatment is largely eliminated by selecting for experiment only worms from cultures 7–14 days old.

Worms for experiment are separated from the culture medium by passage through a "Baermann funnel," followed by washing and sedimentation. The washed worms are distributed among Steuder dishes, each dish containing 2 mls. of a suspension of 200–300 worms. To each dish is added a quantity of the test compound so adjusted that the final dilution of test compound in the Steuder dishes is 0.1% and 0.01%.

The worm suspensions are examined under the low power (×12) dissecting microscope at timed intervals of 10 minutes, 20 minutes, 30 minutes, 1 hour, 2 hours, and 24 hours.

An estimate of the percent motility is made and recorded. A compound which causes a complete loss of motility at a concentration of 0.01% within 24 hours is considered active.

In such a test wherein the activity of tested compounds was indexed according to the following code:

1=Not active
2=Active—complete loss of motility at 0.1% in 24 hours
3=Active—complete loss of motility at 0.01% in 24 hours the compound ethyl dichloromethyl disulfide of this invention was given the most active rating, 3, whereas in a comparative control test containing no test compound the rating was 1, i.e., all the organisms were mobile.

This experiment demonstrates that the test compound effected a complete kill of the nematodes at the more dilute concentration.

*Example 4*

Soil infested with the root-knot nematode *Meloidogyne incognita* var. *acrita* was used to grow tomato plants. The soil was treated with various concentrations of ethyl dichloromethyl disulfide. At a concentration of 0.1 g. of the test compound per pint of soil, no root-knots were observed in any of the tomato plants grown in the infested soil and no plant phytotoxicity was observed.

*Example 5*

This example illustrates the insecticidal activity of alkyl dichloromethyl disulfides.

An acetone solution of ethyl dichloromethyl disulfide diluted with water to a concentration of 10 parts per million with the aid of 3 drops of a surface active agent (sorbitan mono-laurate polyalkylene glycol ether), gave 96% kill of yellow fever mosquito larvae (*Aëdes aegypti*).

The alkyl dichloromethyl disulfides are also effective bacteriostats and fungicides, being effective against such organisms as *Micrococcus pyogenes* var. *aureus, Salmonella typhosa,* and *Aspergillus niger* at concentrations of 1 part per thousand parts of diluent.

The present alkyl dichloromethyl disulfides are effective in eliminating or controlling nematode activity when applied to the soil at a rate of 2 to 600 lbs. per acre. Preferred level of application useful in soils of average infestation are from 50–100 lbs. per acre; heavily infested areas may require the use of higher proportions and lightly infested areas may be treated effectively with smaller proportions. In addition to the use in soils, the invention may be practiced in any other nematode environment, for example, greenhouse potting mixtures and other soil substitutes. Nematode environments may include rooted plants, tubers, seeds, and bulbs, in which case the toxicant is used as a rinse to remove and destroy eggs, larvae, and adult nematodes. The present disulfides are useful in destroying endoparasitic worms other than nematodes which frequently infest barnyards or other areas frequented by domestic animals and fowl.

Reasonable variation and modification of the invention as described are possible, the essence of which is that there have been provided (1) new alkyl dichloromethyl disulfide compounds, (2) methods for making these new sulfur-containing organic compounds, (3) biological toxicant compositions comprising as an essential active ingredient an alkyl dichloromethyl disulfide compound, and (4) methods for controlling biological pests by applying to the situs of said pests a toxic quantity of the compounds of this invention.

What I claim is:

1. A process which comprises reacting thiophosgene with an alkyl mercaptan having from 1 to 12 carbon atoms in the alkyl radical, and recovering from the resulting reaction mixture a dichloromethyl alkyl disulfide having from 1 to 12 carbon atoms in the alkyl radical.

2. A process which comprises reacting thiophosgene with ethyl mercaptan and recovering from the resulting reaction mixture dichloromethyl ethyl disulfide.

References Cited in the file of this patent

UNITED STATES PATENTS

| | | |
|---|---|---|
| 2,884,453 | Tullock | Apr. 28, 1959 |
| 2,909,457 | Birum | Oct. 20, 1959 |
| 2,917,429 | Carleton et al. | Dec. 15, 1959 |

FOREIGN PATENTS

| | | |
|---|---|---|
| 1,064,285 | Germany | Aug. 27, 1959 |

OTHER REFERENCES

Douglas et al.: J. Org. Chem. 16, 1297–1302 (1951). Cited in Chem. Abs. 46 2993 (1952).

Runge et al.: Chemical Abstracts 54, 20946 (1960).

Both periodicals available in Patent Office Scientific Library.